Jan. 2, 1951   M. HARPER   2,536,807
CINEMATOGRAPHIC PROJECTOR FOR USE
WITH DIFFERENT WIDTH FILMS
Filed March 26, 1947   2 Sheets-Sheet 1

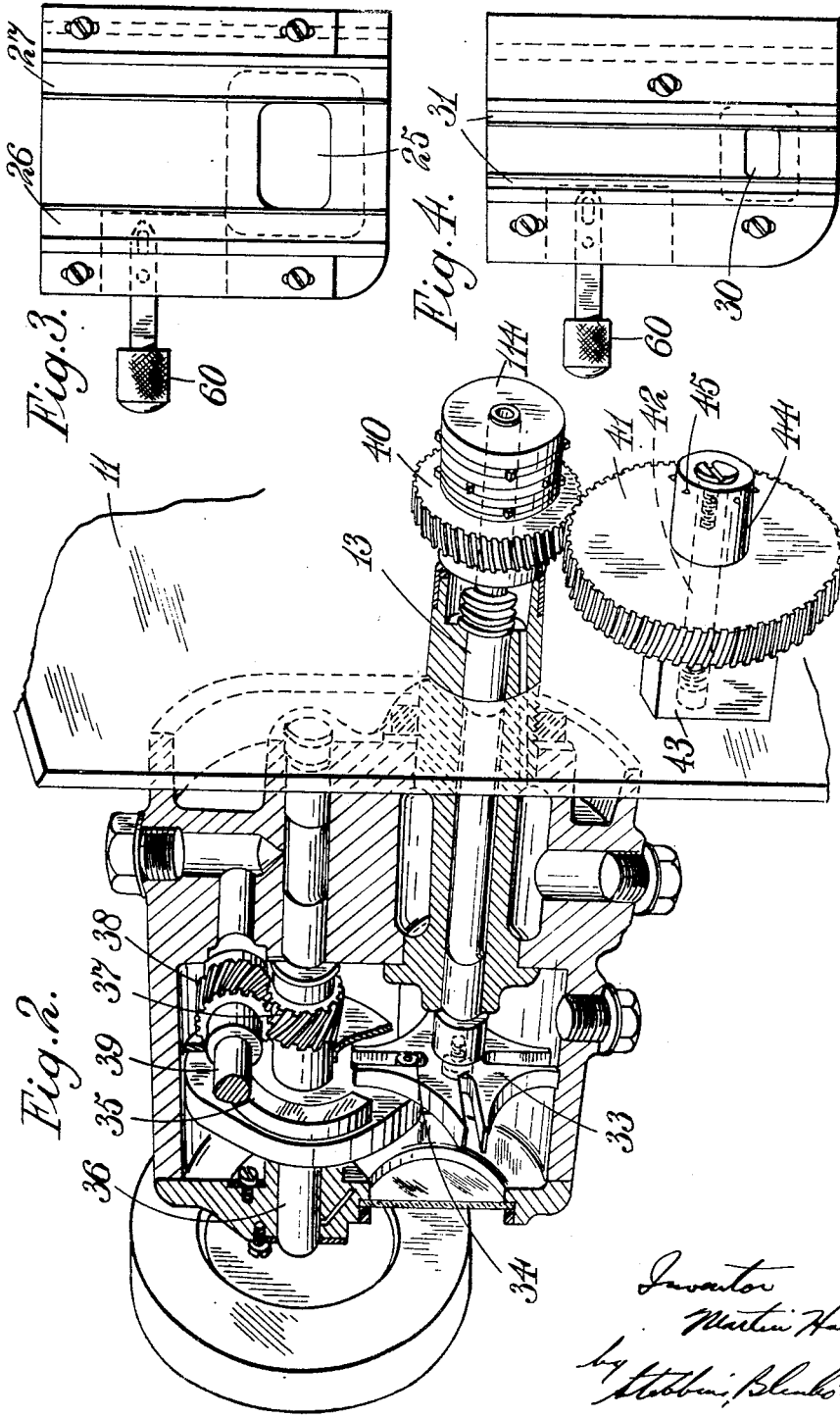

Patented Jan. 2, 1951

2,536,807

UNITED STATES PATENT OFFICE 2,536,807

CINEMATOGRAPHIC PROJECTOR FOR USE WITH DIFFERENT WIDTH FILMS

Martin Harper, Woodford Green, England

Application March 26, 1947, Serial No. 737,284
In Great Britain March 27, 1946

4 Claims. (Cl. 88—18)

This invention comprises improvements in or relating to cinematograph projectors.

It is an object of the invention to provide means whereby substandard, that is to say, 16 millimeter cinematograph film can be projected satisfactorily. It is a further object of the invention to provide in a simple manner for the conversion of existing 35 millimeter standard cinematograph projectors to take substandard film. It is a further object of the invention to provide means whereby a cinematograph projector can project 35 millimeter standard and substandard film at will. "Normal" 16 millimeter substandard film (that is to say such film as at present most commonly used) is provided with a series of perforations, one to each picture, in one side margin of the film for engagement by a claw feed intermittent mechanism and the usual 16 millimeter projectors include a claw device for engaging the film and moving it forward by an amount of one picture frame for each exposure. As the claw can engage the film at only one perforation the stress exerted on the film is substantial and damage to the film ensues fairly rapidly so that after only a few times of use the film becomes unfit for further operation. A life of about 30 runs is as much as is usually obtained and even toward the end of this short life the registration of the pictures in successive picture frames is indifferent as the perforations have been damaged, so that the projected image is extremely unsteady. It would be a great advantage if the film could be given a longer effective life and it would be a further advantage if existing apparatus could be adapted to the projection of substandard film owing to the large amount of such apparatus which is installed.

In addition to the "normal" substandard film above described there is available a special 16 millimeter film which is the subject of United States Patent No. 2,215,502, and which is intended to be sprocket driven in an adapted standard 35 millimeter projector. Such film has the advantage of a longer life than normal substandard film as well as a much superior sound reproduction characteristic, but as will be obvious, the introduction of a special type of film is much limited if apparatus in which it is used is not adapted to handle film of "normal" type.

According to one feature of the present invention, a method of converting a standard 35 millimeter film projector to take "normal" 16 millimeter film comprises the steps of (1) removing the standard sprocket on the intermittent feed shaft, (2) fitting an additional sprocket shaft (or shafts) driven from the intermittent feed shaft (and any other feed shafts) by a reduction gear, (3) providing said additional shaft (or shafts) with a sprocket (or sprockets) having a set of teeth to fit "normal" 16 millimeter film perforations and of a diameter to afford such a linear speed of the film as will correspond to the picture pitch thereof, and (4) fitting a picture-aperture in the gate of appropriate size for the 16 millimeter film. If the above simple steps are carried out on a standard 35 millimeter film projector, the usual sound film reproduction apparatus of the projector will operate in the normal way to reproduce the sound strip on the 16 millimeter film, as the film is driven at approximately half the speed of standard (full size) film and carries a sound track of approximately half the length.

According to a further feature of the invention, a method of converting a standard 35 millimeter film projector to take various films comprises the steps of (1) fitting an additional sprocket shaft (or shafts) driven from the usual intermittent-feed shaft (and any other feed shafts) by a reduction gear, (2) providing said additional shaft (or shafts) with a sprocket (or sprockets) having a set of teeth to fit "normal" 16 millimeter film perforations and of a diameter to afford such a linear speed of the film as will correspond to the picture pitch thereof, (3) providing an additional sprocket for the intermittent feed shaft, interchangeable with the standard 35 millimeter sprocket, having teeth to fit the special 16 millimeter film herein-referred to and to feed it at the same linear speed as 35 millimeter film, and (4) providing an alternative picture aperture for the gate of size suitable for 16 millimeter film and adjustable as to position to fit the pictures to be projected.

The invention further includes a cinematograph projector comprising a film feed spindle intermittently driven by a Geneva or equivalent intermittent motion, a reduction gear connecting said spindle with a second film-feed spindle and means for mounting film sprockets alternatively upon the first spindle or upon the second spindle driven through the reduction gear.

The sprocket on the spindle driven through the reduction gear may comprise a set of teeth spaced to fit the pitch of the perforations in "normal" 16 millimeter film and so to give twice the number of frames of standard 35 millimeter film per revolution of the sprocket, these teeth being located around one edge only of the sprocket. The sprockets for the other spindle, that is to say the higher speed spindle, driven by the Geneva motion or its equivalent, may comprise a sprocket of the normal four picture type for driving 35 millimeter film and as an alternative thereto, and interchangeable therewith, a second sprocket having teeth adapted to fit the perforations of the "special" 16 millimeter film hereinbefore referred to.

The following is a description, by way of example, of one construction of adapting devices for a standard 35 millimeter film projector in accordance with the invention, reference being made to the accompanying drawings in which:

Figure 2 is a perspective view of part of the projector with parts broken away to show the interior construction, Figure 3 is a detail of a standard gate to fit the projector, and Figure 4 is a similar detail of an alternative gate to suit 16 millimeter film.

Figure 5:
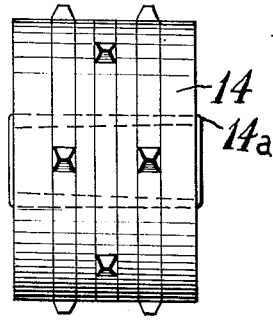
Figure 5 is an end elevation of a sprocket and taper fitting.
Figure 1:
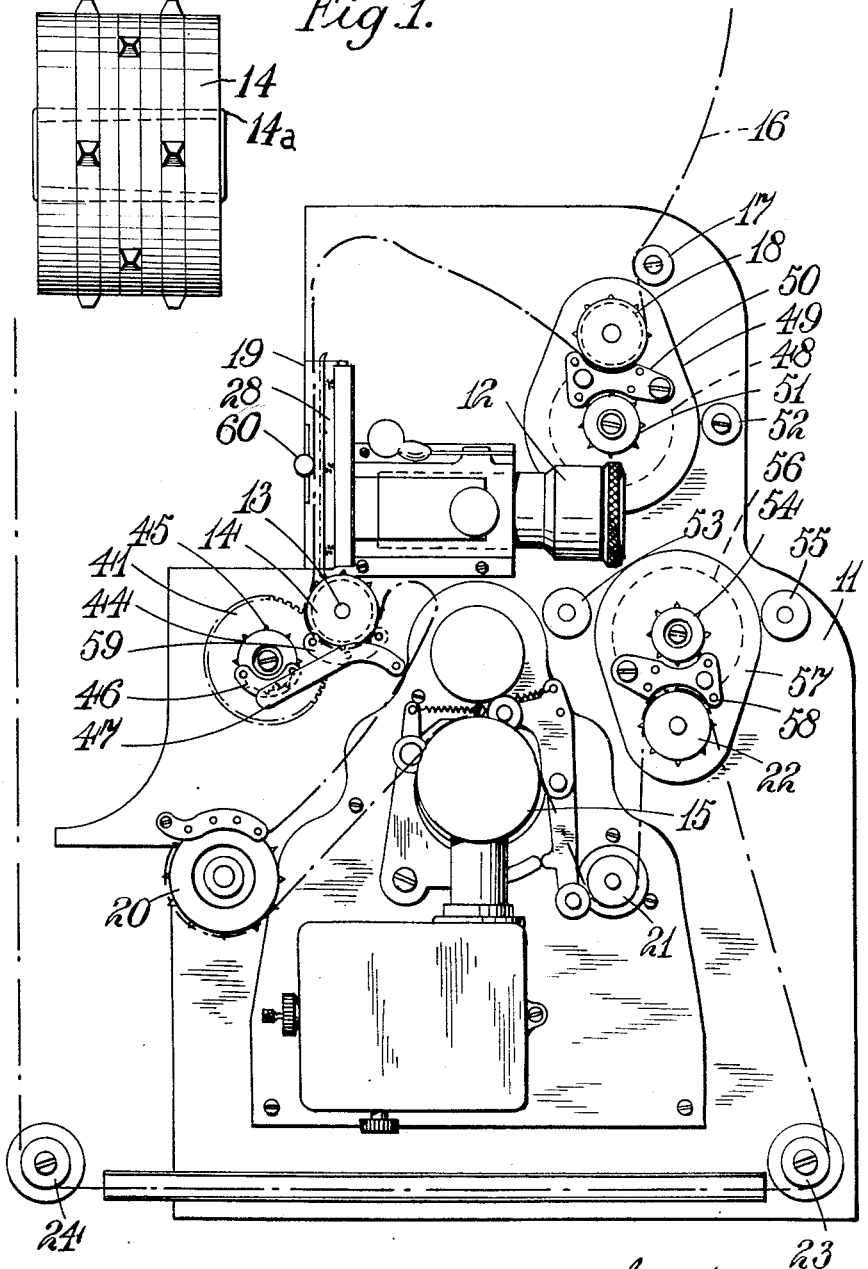
Figure 1 is a side elevation of the projector.

Referring to Figure 1, the projector comprises the usual frame 11 and projector lens 12 having an intermittent feed shaft 13 which carries a feed sprocket 14. There is a sound reproduction apparatus 15 and the film 16, if of standard dimensions, is normally led past a roller 17, around a continuously driven feed sprocket 18, through a gate 19, around the intermittent feed sprocket 14 against which it is pressed by a cradle 59 and thence around a sprocket 20, over the sound reproduction apparatus 15, beneath a roller 21, around a continuously driven feed sprocket 22 and thence, by way of guide rollers 23, 24, to a take-up spool, not shown in the drawing.

If the film is of standard dimensions a standard size gate is employed, such as is shown in Figure 3, having a full size gate-aperture 25 and guideways 26, 27, on which the film is pressed by the spring-platen 28, seen in Figure 1. The sprocket 14, however, is made readily removable from the shaft 13 by a taper fitting 14a on the shaft, such as is described in United States patent application Serial No. 737,285, filed March 26, 1947 and now abandoned, so that instead of the standard film sprocket 14 there may be substituted a sprocket such as the sprocket 114, shown in Figure 2, for driving the "special" substandard film described in the aforesaid United States Patent No. 2,215,502. The sprockets 18 and 22 are also made interchangeable so that substandard film driving sprockets can be substituted for the standard sprocket and substandard film of this type is fed through the projector by the "special" sprockets in the same path and at the same speed as standard film. This special substandard film carries a normal sound track so that the sound is correctly reproduced in the apparatus 15 and the pictures are spaced apart at the same pitch as standard pictures. The pictures are therefore spaced widely apart from one another along the length of the film and when the whole reel has been run through the projector it can be again run through, projecting an alternately arranged set of pictures intercalated with those shown on the first run. For projecting this substandard film a special gate, shown in Figure 4, is used which has a substandard aperture 30 and guides 31 which are narrower than the guides 26, 27, of the standard gate shown in Figure 3 and which fit the 16 millimeter film.

The drive for the intermittent feed shaft 13 is shown in Figure 2 of the drawing and comprises the usual Geneva cross 33 driven by a pin 34 and cam 35 on a driving spindle 36 which is geared by skew gears 37, 38, to a shutter spindle 39. The shutter is not shown in the drawing but is of normal type.

On the spindle 13 is a gear wheel 40 which meshes with a larger gear wheel 41 mounted on a subsidiary spindle 42 carried on a bracket 43. The gear wheel 41 drives a sprocket 44 which carries a single row of teeth 45 spaced to correspond with the perforations in normal 16 millimeter film. The diameter of the sprocket 44 is such that its peripheral speed is half that of the sprocket 26 to correspond with the proper rate of feed for normal 16 millimeter film. The reduction gear can also be seen in Figure 1. A cradle 46 is held against the underside of the sprocket 44, this cradle being mounted on the same lever, 47, as that which carries the cradle 59 before referred to.

In a similar way to the reduction gear 40, 41, there is a reduction gear 48 provided from the spindle which carries the continuously running sprocket 18, this reduction gear being located in a casing 49 and a double cradle 50 is provided between the sprocket 18 and a further sprocket 51, driven from the spindle of the sprocket 18 through the reduction gear 48. If normal 16 millimeter film is to be fed through the projector it is taken underneath a guide roller 52, thence over the sprocket 51 and so to the gate 19, after which it is led beneath the sprocket 44 and thence direct to the sound reproducing apparatus 15. From here it passes below the roller 21 and thence up to another roller 53 below a continuously running feed sprocket 54 over a roller 55 and so downwards to the rollers 23 and 24 and to the take-up spool. The sprocket 54 is driven from the spindle of the sprocket 22 through a reduction gear 56 located in a housing 57, these parts being similar to the reduction gear 48 and housing 49 hereinbefore described. A cradle 58 is located between the sprockets 22 and 54, this cradle being similar to the cradle 50 already described.

As the sprockets 44, 51 and 54 are all driven so as to propel the film at half the lineal speed of standard film it will show correctly in the projector portion of the apparatus and the sound will be reproduced correctly in the apparatus 15. The film gates are vertically adjustable by operating the handle 60 carried thereon so as to move the picture-aperture 25 or 30 as the case may be into register with the pictures in the film.

I claim:

1. In a cinematograph projector for exhibiting film of different dimensions the combination of a film gate, a film-feed spindle adjacent said gate, an intermittent driving mechanism for said film-feed spindle, said spindle having a projecting end portion for supporting a sprocket, a film-feed sprocket thereon in line with said gate to draw film of one dimension therethrough, a second film-feed spindle parallel to the first and also having a projecting portion to support a sprocket, a second film-feed sprocket thereon adjacent said gate and adapted to engage film of a second dimension and a reduction gear connecting said second film-feed sprocket to the first said film-feed spindle so that the second sprocket is intermittently driven thereby at a slower speed thereby drawing the film of second dimension through the gate at a slower speed.

2. In a cinematograph projector, a combination as claimed in claim 1 wherein the intermittent drive for the first film-feed spindle comprises a maltese cross mechanism, and the reduction gear to the second sprocket is of 1:2 ratio.

3. In a cinematograph projector, a combination as claimed in claim 1 wherein the first film-feed spindle is tapered on its projecting portion to permit ready interchangeability of various film-feed sprockets thereon.

4. In a cinematograph projector, a combination as claimed in claim 1 wherein the film-feed sprocket mounted on said second film-feed spindle comprises a set of teeth spaced to fit the pitch of the perforation in "normal" 16 millimetre film, and located around one edge only of the sprocket.

MARTIN HARPER.

REFERENCES CITED

The following references are of record in the file of this patent:

UNITED STATES PATENTS

| Number | Name | Date |
|---|---|---|
| 1,600,592 | Kesses | Sept. 21, 1926 |
| 1,662,057 | Hadley | Mar. 13, 1928 |
| 1,802,045 | Bogopolsky | Apr. 21, 1931 |
| 1,807,737 | Goldhammer | June 2, 1931 |
| 1,893,189 | Watts et al. | Jan. 3, 1933 |
| 1,955,938 | Berkowitz | Apr. 24, 1934 |
| 2,057,153 | Lessler | Oct. 13, 1936 |
| 2,087,250 | Foster | July 20, 1937 |
| 2,233,839 | Heurtier | Mar. 4, 1941 |

FOREIGN PATENTS

| Number | Country | Date |
|---|---|---|
| 782,890 | France | Mar. 25, 1935 |
| 859,736 | France | Sept. 26, 1940 |
| 529,541 | Great Britain | Nov. 22, 1940 |